US006919053B2

(12) United States Patent
Joannou

(10) Patent No.: US 6,919,053 B2
(45) Date of Patent: Jul. 19, 2005

(54) PORTABLE ION GENERATOR AND DUST COLLECTOR

(76) Inventor: Constantinos J. Joannou, 93 Hobart Crescent, Ottawa (Nepean), Ontario (CA), K2H 5S3

( * ) Notice: Subject to any disclaimer, the term of this patent is extended or adjusted under 35 U.S.C. 154(b) by 79 days.

(21) Appl. No.: 10/067,433

(22) Filed: Feb. 7, 2002

(65) Prior Publication Data

US 2003/0147784 A1 Aug. 7, 2003

(51) Int. Cl.[7] ............................................. B01J 19/08
(52) U.S. Cl. ................... 422/186; 422/186.04
(58) Field of Search ............................. 422/186, 186.04

(56) References Cited

U.S. PATENT DOCUMENTS

| | | | |
|---|---|---|---|
| 2,590,447 A | 3/1952 | Nord, Jr. ................ 128/393 |
| 2,949,550 A | 8/1960 | Brown ...................... 310/5 |
| 3,096,762 A | 7/1963 | Winchell et al. ............ 128/190 |
| 4,173,229 A | 11/1979 | Halfon ................... 128/419 R |
| 4,227,894 A | 10/1980 | Proynoff ...................... 55/126 |
| 4,477,263 A | 10/1984 | Shaver et al. .................. 55/6 |
| 4,632,135 A | 12/1986 | Lenting et al. .............. 132/85 |
| 4,643,745 A | 2/1987 | Sakakibara et al. .......... 55/137 |
| 4,713,724 A | 12/1987 | Voelkel ...................... 361/231 |
| 4,811,159 A | 3/1989 | Foster, Jr. .................. 361/231 |
| 4,941,068 A | 7/1990 | Hofmann .................... 361/231 |
| 5,024,685 A | 6/1991 | Torok et al. ................. 55/117 |
| 5,141,529 A | 8/1992 | Oakley et al. ................. 55/2 |
| 5,196,171 A | 3/1993 | Peltier ..................... 422/121 |
| 5,296,019 A | 3/1994 | Oakley et al. ................. 96/95 |
| 5,435,837 A | 7/1995 | Lewis et al. ................. 96/54 |
| 5,484,472 A | 1/1996 | Weinberg ..................... 96/26 |
| 5,518,531 A | 5/1996 | Joannou ...................... 96/55 |
| 5,535,089 A | 7/1996 | Ford et al. ................. 361/231 |
| 5,538,692 A | 7/1996 | Joannou .................... 422/121 |
| 5,578,112 A | 11/1996 | Krause ....................... 96/24 |
| 5,607,497 A | 3/1997 | Brown ......................... 95/3 |
| 5,667,564 A | 9/1997 | Weinberg ..................... 96/58 |
| 5,814,135 A | 9/1998 | Weinberg ..................... 96/58 |
| 6,042,637 A | 3/2000 | Weinberg ..................... 96/58 |
| 6,077,334 A | 6/2000 | Joannou ....................... 96/66 |
| 6,126,722 A | 10/2000 | Mitchell et al. .............. 95/57 |
| 6,149,717 A | 11/2000 | Satyapal et al. .............. 96/16 |
| 6,176,977 B1 | 1/2001 | Taylor et al. ............... 204/176 |
| 6,312,507 B1 | 11/2001 | Taylor et al. ................ 96/19 |
| 6,379,427 B1 | 4/2002 | Siess ........................ 95/57 |
| 6,508,982 B1 | 1/2003 | Shoji ....................... 422/22 |
| 6,544,485 B1 | 4/2003 | Taylor ................... 422/186.04 |
| 6,588,434 B2 | 7/2003 | Taylor et al. .............. 132/116 |
| 6,632,407 B1 * | 10/2003 | Lau et al. .................. 422/186 |

* cited by examiner

*Primary Examiner*—Steven Versteeg
(74) *Attorney, Agent, or Firm*—David J. French

(57) ABSTRACT

This invention relates to a portable, battery-operated ion generator featuring an electronic high voltage system which uses extremely low battery power. The ion generator can be made in the form of a pendant using a standard 9-volt alkaline battery, which can last for several months of continuous operation. The ion generator can also serve as a dust collector for air purification. In particular, the dust collecting electrode is removable for ease of cleaning.

22 Claims, 3 Drawing Sheets

PORTABLE ION GENERATOR AND DUST COLLECTOR

FIELD OF THE INVENTION

This invention relates to ion generators and in particular battery-operated portable ion generators for personal use and for air purification.

BACKGROUND TO THE INVENTION

Negative ion generators have been extensively used for many years to improve the air environment in a room or in a car. Typically these ion generators require power from household outlets or from car cigarette lighter sockets. This fact makes such units awkward to install because of the wires involved.

Ion generators have also been used as air purifiers by acting as dust collectors. An example of such an application is U.S. Pat. No. 5,538,692 (adopted by reference herein).

During my experiments with ionizers, I found that a good stream of ions can be produced having a very small current passing through the ionizing needles. For instance 1 microampere of current will produce ($10^{-6} \times 6.28 \times 10^{23}$) or $6.28 \times 10^{17}$ ions per second where $6.28 \times 10^{23}$X is Avogadro's number, namely the number of electrons in one Coulomb of charge. One coulomb per second is one ampere. Therefore, the number of ions per second generated by a current of one microampere is 628 followed by 15 zeroes.

Assuming the ionizer is powered by a 9 volt battery and assuming an ideal transformation circuit to generate high voltage, the current drawn from the battery would be inversely proportional to the voltage of the battery. Thus, if the ionizing voltage is $6 \times 10^3$ volts, the battery current drawn from a 9 volt battery would be $1 \times 10^{-6} \times (6 \times 10^3/9) = 0.666$ milliamps. Even if one assumes a 50% efficient for a practical transformation circuit, a battery current of only be 1.33 milliamps would be required to generate $6.28 \times 10"$ ions/sec. Current of this magnitude could be easily accommodated by an ordinary battery, particularly those of the alkaline type.

My present invention provides for such an efficient voltage converter.

It is therefore an object of my invention to provide an ion generator which is portable, battery operated and small enough to be worn as a pendent with a very long battery life.

It is another object of my invention to provide a battery operated, self-contained, ionizing dust collector which can be placed on a desk or on a car dash.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

My invention, in one aspect is based on a circuit which includes an oscillator which changes the battery voltage from DC to AC. The AC voltage is then transformed to a higher voltage by a voltage conversion circuit. Preferably, such a circuit includes a transformer which charges an output capacitor. This capacitor can be the last capacitor of a diode-capacitor multiplier circuit in the form of a "ladder" network. Either a single capacitor or group capacitors constitutes a capacitor means, as hereafter so referenced. The capacitors in the bank of capacitors in the diode-capacitor multiplier each charges up to twice the output transformer voltage. The entire diode-capacitor ladder network multiplier can build the voltage up by 10 times or more. The output capacitor means in all cases supplies voltage to the ionizing element, eg. to an ion generating needle(s).

In my experiments, I have found that the voltage on the output capacitor means will remain high for a while even after the input the oscillator stops operating. The reason for this is that the ionizing needle(s) take a very small current out of the capacitor means (a few microamperes). In view of the above, I reasoned that the oscillator does not have to be operating all the time in order to provide sufficient voltage to the ionizing needle(s). Instead it can operate intermittently. In this way, a lot of energy from the battery can be saved.

Thus, according to the invention, the driving oscillator is turned ON for only intermittent intervals, e.g. only approximately one tenth of the time, without much loss of output voltage on the ionizing needle(s). In particular, an experimental ionizer operating from a 9-volt battery has been shown to draw only 120 microamps from the battery and is expected to last for in excess of three months of continuous operation.

In making ion generators completely self contained without connection to a power outlet, there is a need to provide a counter electrode. The counter electrode must be connected to an output lead of the transformer to provide a current flow through the ladder network. Normally this lead would be grounded to earth through the power source i.e. the grid power outlet or the cigarette lighter socket in a car. But in case of a self-contained unit, there is no readily apparent place for connection of the counter electrode.

I have found that a relatively large conducting body compared to the ion emitter can be made to act as a counter electrode. This can be a large piece of metal that the unit sits on or a human body, as in the case where an ionizer is worn as a pendant. Conveniently, the strap or chain suspending the ionizer may provide the electrical connection to the body. Ions will then be drawn to the body completing the circuit. When a large plate is used as the counter-electrode, it will attract the ions being generated, thus similarly completing the electrical circuit.

According to a further aspect, my invention provides a self contained battery-operated ionizer which can also collect dust by using a conductive or partially conductive dust collecting surface which is connected as a counter electrode. This dust collecting surface, which is of an opposite polarity from that of the needle(s), collects the dust particles which are charged by the ions emitted by the ionizing needle(s) in the manner of U.S. Pat. No. 5,538,692. An especially useful feature of this present invention is that the dust collecting surface is separable from its base and may be removed for cleaning.

The foregoing summarizes the principal features of the invention and some of its optional aspects. The invention may be further understood by the description of the preferred embodiments, in conjunction with the drawings, which now follow.

BRIEF DESCRIPTION OF THE DRAWINGS

FIG. 2 is a practical circuit which produces the waveform of FIG. 1a.

DESCRIPTION OF THE PREFERRED EMBODIMENT

Figure 1:
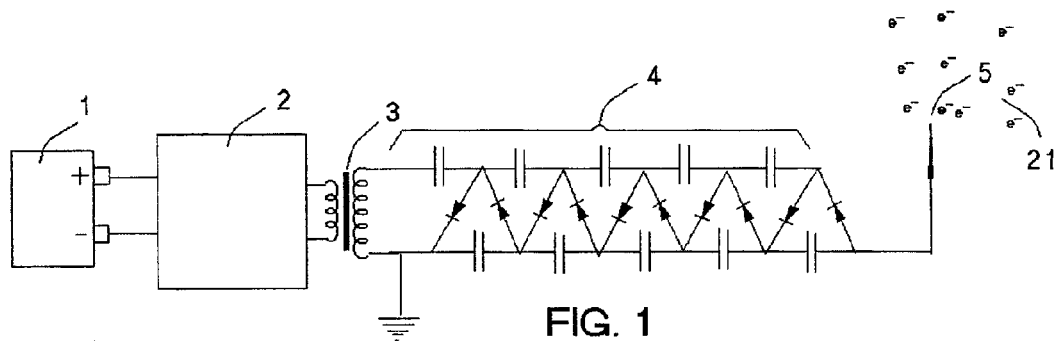
FIG. 1 shows the basic electronic circuit for the battery operated portable ionizer.
Figure 1A:
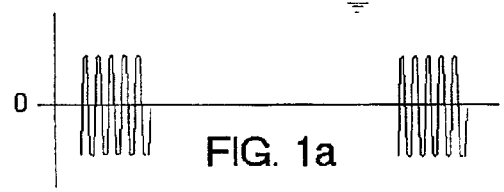
FIG. 1a is a timing diagram showing the current waveform over time at the input to the transformer of FIG. 1.

In FIG. 1, a battery 1 supplies power to electronic circuit 2. Circuit 2 provides an AC voltage to transformer 3. Circuit 2 is such that it produces an interrupted or intermittent AC voltage to transformer 3 as shown in FIG. 1a. While a single high voltage transformer may be employed as a voltage conversion circuit, a preferred system relies upon a ladder network as in FIG. 1. Connected to the output of transformer 3 is a diode-capacitor multiplier 4 which produces a high voltage (in this case negative) to ionizing needle 5 which serves on an ion-emitter. Ions 21 are rapidly repelled outwardly from the tip of the needle 5 by their repulsive charge. During the period of time when circuit 2 is active (ON), the capacitors in the diode-capacitor multiplier 4 get charged up; and during the inactive period (OFF), the capacitors keep their voltage minus a small amount due to current drawn out by the ionizing needle.

Figure 1B:
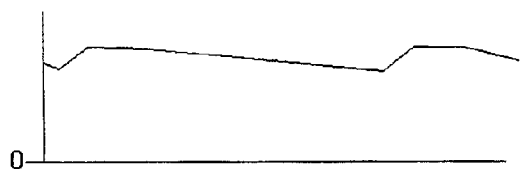
FIG. 1b is a timing diagram showing how the high voltage at the output of the diode-capacitor multiplier varies with time.

FIG. 1b shows the waveform of the voltage at the ionizing needle. With this arrangement, the ionizing needle keeps emitting ions even during the time when the circuit 2 is OFF. The ratio of time during which circuit 2 is ON as compared to the time it is OFF can be as much as 10 to 1 or greater. The current drain on the battery is much smaller than if the circuit 2 were ON continuously. In this way, a battery supplying power to the ionizer unit will last for a very long time with very little sacrifice in efficiency of the ionizer. In one case, an ionizer built using a standard 9 volt alkaline battery is estimated to last for 3 months of continuous operation. Using larger batteries, size C for example, a portable ionizer can be built where the batteries may last for more than a year, subject to their inherent shelf-life.

Figure 2:
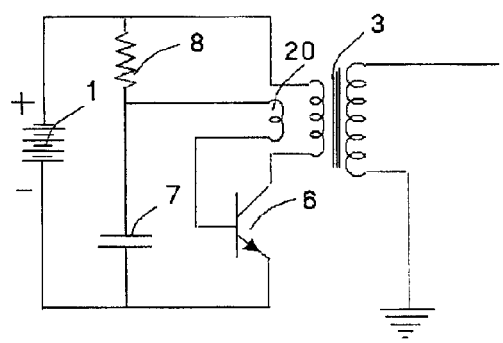

FIG. 2 shows a very simple circuit for an oscillator which can be used to produce the intermittent voltage. A tickler coil 20 on the transformer 3 induces oscillations because the base of transistor 6 receives an out-of-phase voltage from the transformer 3 which produces positive feedback causing oscillations. When the oscillator starts, the base circuit winding produces an AC voltage which gets rectified by the base-emitter junction of the transistor and develops a negative voltage on capacitor 7. This negative voltage buildup eventually biases the transistor OFF. This state lasts until the voltage accumulated on the capacitor 7 leaks off via the resistor 8 and the process starts all over again.

Figure 3:
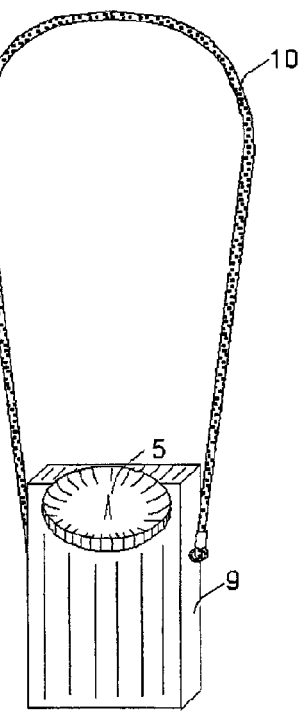
FIG. 3 shows an ionizer made into a pendant with a conductive cord by which can be worn by a person. The person in such case acts as the counter electrode.

FIG. 3 shows a practical application of one aspect of the invention where a battery-operated negative ion generator is made into a pendant 9. Strap 10 is made of either a metallic chain or a cord made of conducting plastic or the like. Strap 10 is connected internally to the ground terminal of the transformer or diode-capacitor multiplier. The wearer acts as the counter electrode to the needle electrode 5. Other forms of conductive connection means to the body may also be provided, such as by a metal plate that is held in the hand.

Figure 4:
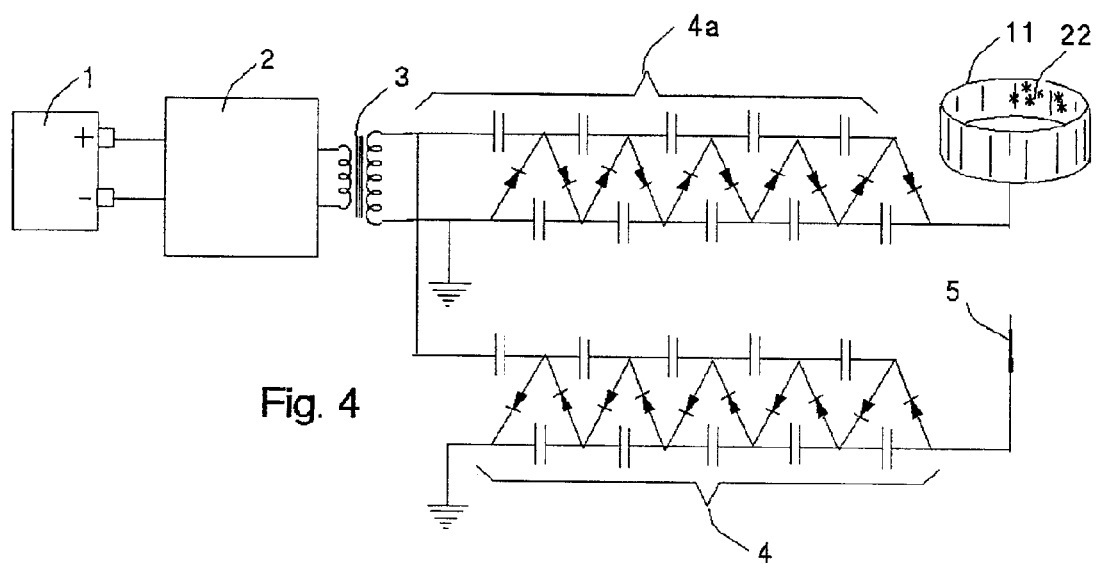
FIG. 4 is a similar circuit as that of FIG. 1 intended for a dust collector with the addition of an optional second diode-capacitor multiplier to produce a second voltage of opposite polarity which is connected to an element which acts as the counter electrode.

FIG. 4 is a variant of the circuit of FIG. 1. Here, another diode-capacitor multiplier 4a is added to produce a positive high voltage. The positive high voltage of ladder network 4a is connected to a metal counter electrode, in this case ring 11. (Polarities in this and other applications may be reversed). This ring 11 is exposed to receive dust particles 22 charged by ions 21 emitted by needle 5. Upon being discharged by contact with ring 11 the dust particles 22 will generally remain attached to the ring 11. Periodically, the ring 11 may be cleaned of such dust particles.

Figure 5:
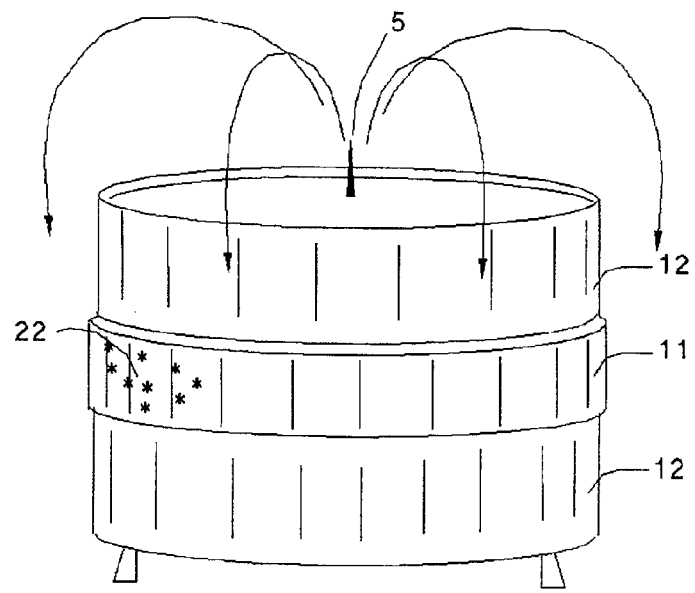
FIG. 5 shows a practical application of the circuit of FIG. 4, wherein the ring in the middle of the cylinder acts as the counter electrode and also collects dust which is charged by the ions.

FIG. 5 shows an arrangement where the ionizer unit is made in a cylindrical case 12 serving as a base having an ionizing needle 5 on top and the counter electrode ring 11 in the middle of the case. The ring 11, being for example at positive potential, attracts anything that is charged negatively including dust 22. In this way, the ionizer also becomes an air cleaner.

Figure 6:
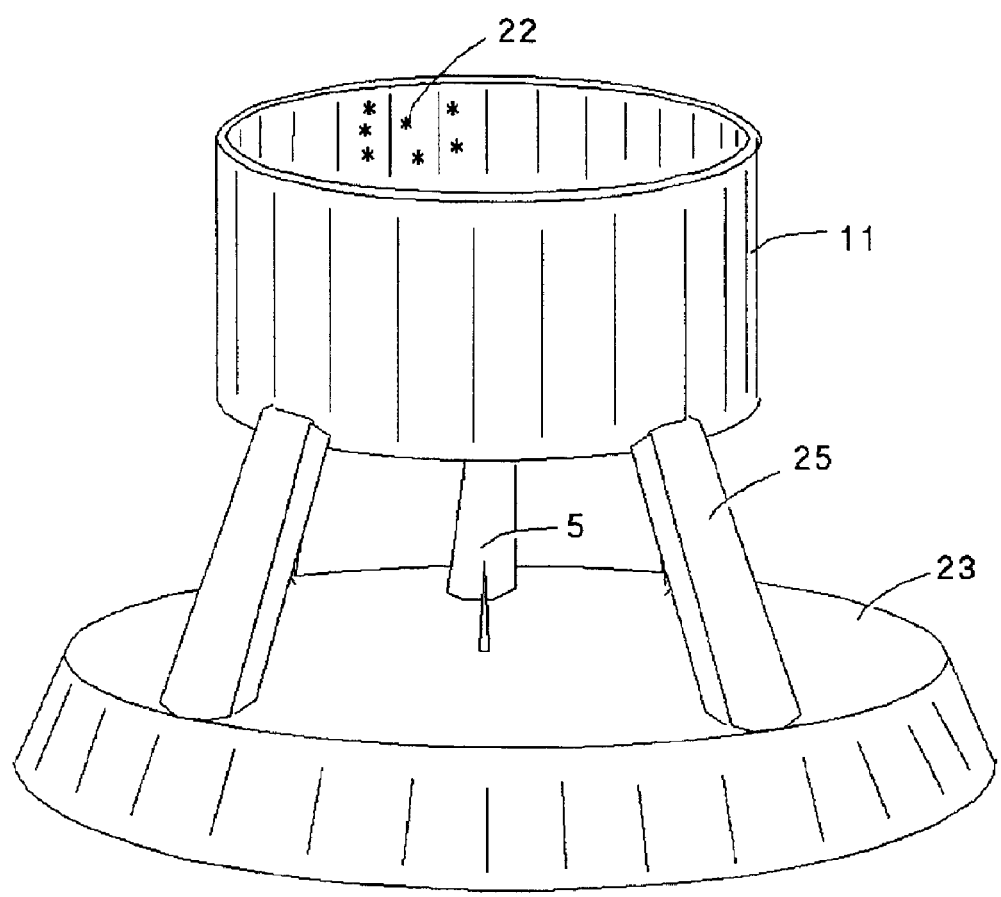
FIG. 6 shows another application of the apparatus of FIG. 5. In this case a removable conducting ring is located above the ionizing needle. Ions generated by the needle are attracted to the ring, which also collects dust which has been charged by the ions.

FIG. 6 shows a similar arrangement as that of FIG. 5, except in this arrangement the counter electrode ring 11 is located, for example above the ionizing needle 5, mounted above a base 23 by spaced struts 25 which serve as a support and provide electrical contact between the circuit 2 and ring 11. Air may pass freely over this base 23, flowing to the needle 5 and upwardly through the ring 11. The dust particles 22, charted by the negative ions 21 produced by the needle 5, are attracted by the positively charged ring 11 which acts as a counter electrode. Some of the charged dust 22 attracted by the ring 11 adheres to it. The ring 11 in FIG. 6 may be readily removed from its support for cleaning.

The relative positions of the ring 11 and needle 5 requires only that they be in a spaced relationship so that, mixed with air, ions will flow from the needle 5 to the ring

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property or privilege is claimed are defined as follows:

1. A portable battery operated ionizer comprising:
   a) an electrical circuit adapted to be powered by a low-voltage current supplied by a battery;
   b) an oscillator circuit within the electrical circuit for being powered by the low-voltage current supplied by the battery, said oscillator circuit being connected to a voltage conversion circuit to provide an ionizing voltage to an output capacitor means;

c) am ion-emitter connected to receive charge from the voltage conversion circuit and output capacitor means, said ion-emitter being exposed for possible direct manual contact by a user and for release of ions into the surrounding environment; and d) electrode connection means to provide for a counter-electrode to be connected to said electrical circuit, to induce the emission of ions from the ion-emitter, wherein said oscillator producer intermittent oscillations such that the voltage established at the output capacitor means is an ionizing voltage and wherein, ion emission continues from said ion-emitter during the time the oscillator is not producing oscillations, supplied by charge from the output capacitor means.

2. An ionizer as in claim 1 wherein she voltage conversion circuit comprises a high voltage step-up transformer and the output capacitor means comprises a diode-capacitor multiplier network driven by the transformer for producing said ionizing voltage.

3. An ionizer as in claim 1 wherein said electrode connection means comprises a conductive connection means whereby an external body may become electrically connected to said electrical circuit to serve as at least part of the counter-electrode.

4. An ionizer as in claim 3 wherein said conductive connection means is a conductive strap that supports the ionizer as a pendant for attachment to a human being as the external body.

5. A battery-operated, portable ionizer comprising:

a) an electrical circuit adapted to be powered by a low-voltage current supplied by a battery;

b) an oscillator circuit within the electrical circuit for being powered by the low-voltage current supplied by the battery;

c) a voltage conversion circuit connected to the oscillator circuit to provide an ionizing voltage to an output capacitor means;

d) an ion-emitter connected to receive charge from the voltage conversion circuit and output capacitor means and provide ion-emission, said ion-emitter being exposed, when in use, for release of ion into the open air, and e) a conductive connection means whereby an external body may become electrically connected to said electrical circuit to serve as, at least, part of a counter-electrode to induce emission of ions by the ion-emitter.

6. An ionizer as in claim 5 wherein said conductive connection means is a conducive strap that support the ionizer as a pendant for attachment to a human being as the external body.

7. An ionizer as in claim 6 wherein the voltage conversion circuit comprises a diode-capacitor multiplier network driven by a transformer for producing said ionizing voltage, and said diode-capacitor multiplier network comprises said out put capacitor means.

8. An ionizer as in claim 7 comprising intermittent oscillator control means whereby said oscillator produces intermittent oscillations such that the voltage established at the output capacitor means provides said ionizing voltage while oscillations are occurring, and wherein said ion emission continues during the time the oscillator is not producing oscillations, supplied by charge from the output capacitor means.

9. An ionizer as in claim 8 wherein the oscillator, when it is not producing oscillations, is not producing oscillations for up to ten times as long as when the oscillator is producing oscillations.

10. An ionizer as in claim 6 comprising intermittent oscillator control mean whereby said oscillator produces intermittent oscillations such that the voltage established at the output capacitor means provides said ionizing voltage while oscillations are occurring, and wherein said ion emission continues during the time the oscillator is not producing oscillations, supplied by charge from the output capacitor means.

11. An ionizer as in claim 10 wherein the oscillator, when it is not producing oscillations, is not producing oscillations for up to ten times as long as when the oscillator is producing oscillations.

12. An ionizer as in claim 5 wherein the voltage conversion circuit comprises a diode-capacitor multiplier network driven by transformer for producing said ionizing voltage, and said diode-capacitor multiplier network comprises said out put capacitor means.

13. An ionizer as in claim 12 comprising intermittent oscillator control means whereby said oscillator produces intermittent oscillations such that the voltage established at the output capacitor means provides said ionizing voltage while oscillations are occurring, and wherein said ion emission continues during the time the oscillator is not producing oscillations, supplied by charge item the output capacitor means.

14. An ionizer as in claim 13 wherein the oscillator, when it is not producing oscillations, is not producing oscillations for up to ten times as long as when the oscillator is producing oscillations.

15. An ionizer as in claim 5 comprising intermittent oscillator control means whereby said oscillator produces intermittent oscillations such that the voltage established at the output capacitor means is an ionizing voltage and wherein said ion emission continues during the time the oscillator is not producing oscillations, supplied by charge from the output capacitor means.

16. An ionizer as in claim 15 wherein the oscillator, when it is not producing oscillations, is not producing oscillations for up to ten times as long as when the oscillator is producing oscillation.

17. A battery-operated, portable ionizer comprising:

a) an electrical circuit adapted to be powered by a low-voltage current supplied by a battery;

b) an oscillator circuit within the electrical circuit powered by the low-voltage current supplied by the battery;

c) a voltage conversion circuit connected to the oscillator circuit to provide an ionizing voltage to an output capacitor means;

d) an ion-emitter connected to receive charge from the voltage conversion circuit and output capacitor means, said ion-emitter being exposed, when in use, for release of ions into the open air, and e) a conductive connection means whereby a human body may become electrically connected to said electrical circuit to serve as a counter-electrode to induce emission or ions by the ion-emitter.

18. An ionizer as in claim 17 wherein the voltage conversion circuit comprises a diode-capacitor multiplier network driven by a transformer for producing said ionizing voltage, and said diode-capacitor multiplier network comprises said out put capacitor means.

19. An ionizer as in claim 18 comprising intermittent oscillator control means whereby said oscillator produces intermittent oscillations such that the voltage established at the output capacitor means provides said ionizing voltage while oscillations are occurring, and wherein said ion emission continues during the time the oscillator is not producing, oscillations, supplied by charge from the output capacitor means.

20. An ionizer an in claim 19 wherein the oscillator, when it is not producing oscillations, is not producing oscillations for up to ten times as long as when the oscillator is producing oscillations.

21. An ionizer as in claim 17 comprising intermittent oscillator control means whereby said oscillator produces intermittent oscillations such that the voltage established at the output capacitor means provides said ionizing voltage while oscillations are occurring, and wherein said ion emission continues during the time the oscillator is not producing oscillations, supplied by charge from the output capacitor means.

22. An ionizer as in claim 21 wherein the oscillator, when it is not producing oscillations, is not producing oscillations for up to ten times as long as when the oscillator is producing oscillations.

* * * * *